United States Patent [19]
Hertel et al.

[11] 3,836,984
[45] Sept. 17, 1974

[54] LIGHT SEALED FILM CARTRIDGE
[75] Inventors: Heinz E. Hertel, Mount Prospect; George K. Konagamitsu, Chicago, both of Ill.
[73] Assignee: Bell & Howell Company, Chicago, Ill.
[22] Filed: Apr. 9, 1973
[21] Appl. No.: 349,495

[52] U.S. Cl. ................ 354/275, 352/72, 242/71.2, 352/78
[51] Int. Cl. .......................................... G03b 17/26
[58] Field of Search ...... 95/31 CA, 31 R; 352/72 R, 352/78 R, 78 C; 242/71.2, 71.7

[56] References Cited
UNITED STATES PATENTS

| | | | |
|---|---|---|---|
| 2,326,654 | 8/1943 | Jagust | 242/71.2 |
| 2,624,233 | 1/1953 | Foster | 242/71.2 X |
| 2,674,166 | 4/1954 | Sochor | 242/71.2 X |
| 3,010,361 | 11/1961 | Pfaff | 242/71.2 X |

Primary Examiner—Robert P. Greiner
Attorney, Agent, or Firm—Robert A. Walsh; Gerald B. Epstein

[57] ABSTRACT

A self-threading, light sealed film cartridge having a curtain device located outside the light sealed portion of the cartridge and adapted to automatically cover and uncover an exposure window in the cartridge. The film end is fixed to the core of a film supply reel, whereby a portion of the film remains adjacent the exposure window after the film in the cartridge has been exposed, enabling removal of the exposed film through the exposure window in the cartridge without destroying the cartridge. A combined film spring compression device, film footage indicator and end-of-reel switch actuator is located in the cartridge, and is formed from a single piece of molded material.

10 Claims, 7 Drawing Figures

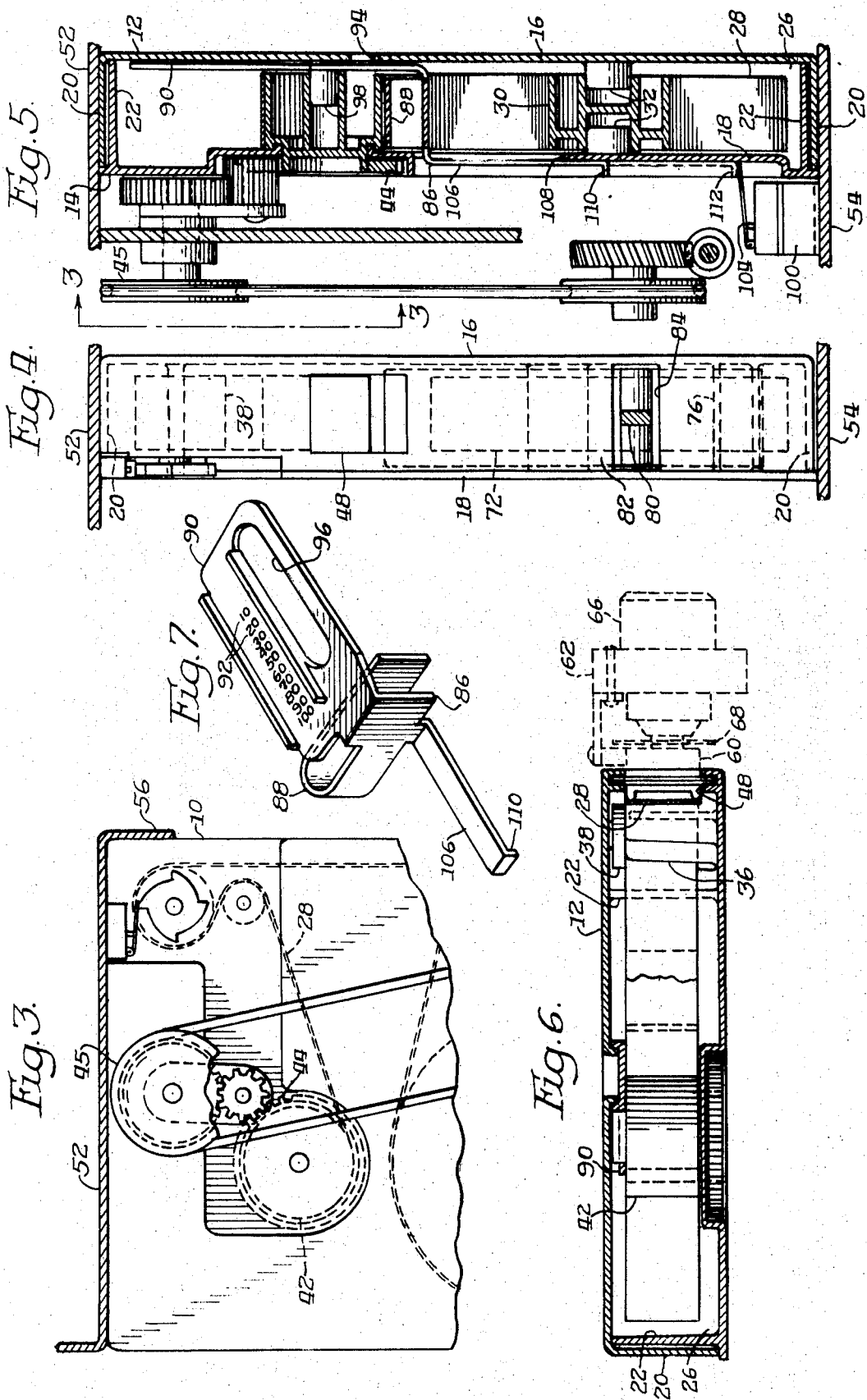

LIGHT SEALED FILM CARTRIDGE

The present invention relates to a film cartridge assembly, and in particular to a self-threading film cartridge having mounted therein a reel of film to be exposed and adapted to be inserted in and removed from a housing such as a microfilm camera housing.

Microfilm cameras are being extensively used by small as well as large organizations to photographically record important and valuable documents. The storage of a facsimile of these documents enables the elimination of elaborate file systems, freeing previously used document storage space for other productive purposes.

Present microfilming cameras are large, cumbersome, and expensive, often requiring specially trained personnel to operate and use the equipment. However, many smaller organizations cannot afford the time, expense, or manpower necessary to efficiently utilize present microfilming systems due to their relatively low volume of document storage work. These smaller organizations have been compelled to send their work to be microfilmed to outside contractors, or have these contractors bring in elaborate equipment to their facilities once a sufficient amount of documents has been accumulated.

Some compact microfilming equipment currently available is adapted to be used with cartridge-supplied film. However, many of these cartridges must be threaded into the camera by the operator, requiring loss of time and efficiency. In addition, in many cartridge-supplied microfilm cameras, the camera itself comprises a separate unit from the optical image projection system, and must be inserted and removed through an open door in the camera housing. By repeatedly opening the housing in this way, the light sealed chamber in which the projection system functions is disturbed, enabling light to enter the camera and possibly expose a quantity of film near the exposure window of the cartridge. To avoid partial exposure of the film in the cartridge, some manufacturers have included light shield devices in the cartridge which slide past the aperture window when the cartridge is removed from the camera housing. However, such cameras include a complicated mechanical system for moving the shield one way when the cartridge is inserted in the camera, and for moving the shield back again when the cartridge is removed.

Most present cartridge-supplied microfilm recording devices include a film footage meter which indicates the amount of unexposed film remaining in the cartridge. However, this meter is usually located on the camera housing itself. As a result, if a cartridge of film is removed from the camera before reaching the end of the film, the cartridge itself bears no indication of the amount of unexposed, usable film remaining in the cartridge. Further, some cameras of the type described have no means to indicate to the operator the approaching end of the reel of film in the cartridge.

An additional disadvantageous feature found in present cartridges used with microfilm cameras is the need to break the cartridge to remove the film, which requires extra time during developing.

Therefore, it is a primary object of the present invention to provide a self-threading film cartridge particularly adapted to be used in microfilm cameras, which cartridge may be inserted into a camera by an operator and be instantly ready for use.

It is also an object of the present invention to provide a film cartridge particularly adapted for use in a microfilm camera which can be inserted in and removed from the camera while remaining outside the light sealed chamber in which the camera's projection system is located, without the need to open any doors or to remove any part of the projection or lens system.

Still another object of the present invention is to provide a film cartridge particularly adapted for use in a microfilm camera which includes self-biasing means for automatically covering the exposure window in the cartridge when the cartridge is removed from the camera. The cover means coacts with a portion of the camera housing to remove the cover from the exposure window when the cartridge is inserted in the camera.

An additional object of the present invention is the provision of a microfilm camera film supply cartridge including a film footage meter within the cartridge and visible through the cartridge casing.

Yet another object of the present invention is to provide a self-threading microfilm camera film supply cartridge which includes means for actuating an end-of-film signal device associated with the camera housing.

Still another object of the present invention is to provide a combined molded element for insertion in a film cartridge which maintains a pressure force between film accumulated on the supply and take-up spools in the cartridge, and includes a film footage meter thereon, and has an end-of-reel actuator arm attached thereto.

While it has been stated that the primary purpose of this invention is to provide a film cartridge for microfilm cameras, many of the features of the present invention are not limited to microfilm cartridges, or in fact to cartridges containing film. The present inventive concepts are equally applicable to other applications where a different web material, such as magnetic tape or the like, is supplied by cartridge for use in a device.

Other objects, features, and advantages of the present invention will be readily apparent from the following detailed description of a preferred embodiment of the invention, taken in conjunction with the accompanying drawings in which:

FIG. 3 is a detail view of one form of a preferred drive mechanism for advancing the film contained in the cartridge;

FIG. 4 is a view of the cartridge taken along the line 4—4 in FIG. 1;

FIG. 5 is a view of the cartridge taken along the line 5—5 in FIG. 2;

FIG. 6 is a partial cut-away top view of the cartridge taken along the line 6—6 in FIG. 1; and FIG. 7 is a detail view of the combined molded film compression spring, film footage meter and end-of-film actuator arm forming part of the present invention.

Figure 2:
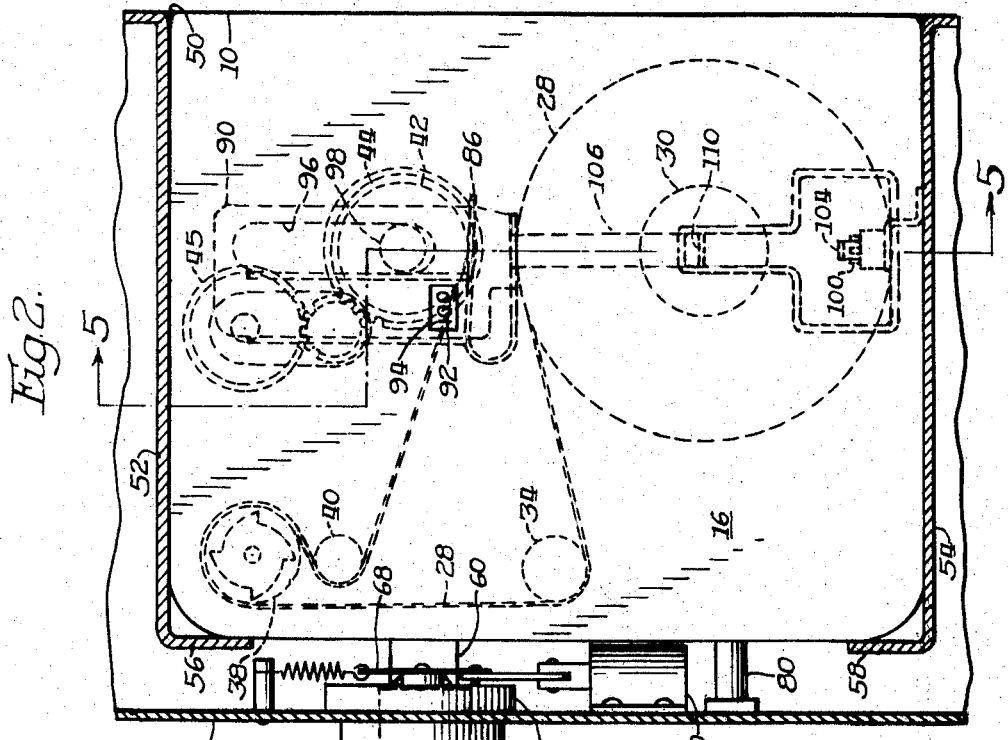
FIG. 2 is an elevation view of the cartridge of FIG. 1, with the cover plate in place.

Referring to FIGS. 1, 2, 4 and 5, the cartridge embodying the concepts of the present invention is generally designated by the numeral 10. The cartridge is formed by the juncture of two U-shaped shells 12, 14, whereby the surface 16 of shell 12 forms one outer covering for the cartridge, and the surface 18 forms the opposite outer covering for the cartridge. End panels 20, 22 of shells 12, 14 respectively, are aligned in juxtaposition relative to one another (FIG. 5) to form two parallel walls around the lateral border of cartridge 10. The two parallel walls form a guide channel 24 therebetween for purposes to be explained.

Inside of cartridge 10 is light sealed chamber 26 in which a supply reel of web material, such as film 28, is located. Film 28 is wound around a core element 30, which is rotatably held in chamber 26 by means of spindles 32. The end of film 28 adjacent core 30 is permanently fixed to the core so that the film always remains attached thereto.

Film from reel 28 in cartridge 10 is threaded in a path extending around guide roller 34 past exposure station 36 to measuring capstan 38. The film next passes around guide roller 40 to take-up spool 42. Take-up spool 42 is provided with suitable drive means 44 which are associated with drive means 45 disposed in camera housing 46, which housing is adapted to receive cartridge 10. Drive means 44 and 45 provide the means for incrementally advancing film 28 along the path just described. The construction and operation of drive means 44 and 45 is described in greater detail in the copending patent application of R. L. Kearney, G. W. Bookless and Heinz Hertel, titled "Microfilm Camera Apparatus."

Adjacent exposure station 36 and extending through end panels 20, 22 is an exposure window 48 through which an image is projected onto film 28 as the film comes to rest adjacent the exposure station. The end of film 28 is prevented from advancing to take-up-spool 42 by being attached to core 30. As a result, when the film supply 28 is exhausted, a strip of film will remain adjacent exposure window 48. To remove the exposed film from the cartridge for purposes of developing the film, it is necessary only to insert a hooked implement or the like into exposure window 48 and pull the film through the window until all of the film has been removed from take-up-spool 42. In this way, the film 28 may be removed from cartridge 10 without destroying the cartridge.

The camera housing 46 in which cartridge 10 is adapted to be inserted includes a cartridge chamber 50 formed by an upper wall 52 and a lower support member wall 54. Flanges 56, 58 extending from walls 52, 54 respectively, define the inward position of cartridge 10 in the housing, and assist in properly locating the cartridge. As cartridge 10 is inserted in chamber 50, aperture block 60 is adapted to extend through exposure window 48 and firmly but releasably hold film 28 against exposure station 36. Aperture block 60 is fixed to lens frame 62 which, in turn, is secured to camera housing wall 64. Frame 62 also supports lens assembly 66 through which an image is projected onto film 28 through aperture block 60 and exposure window 48. A shutter 68 operated by solenoid 70 is located between lens assembly 66 and aperture block 60 to control the exposure of film 28.

Figure 1:
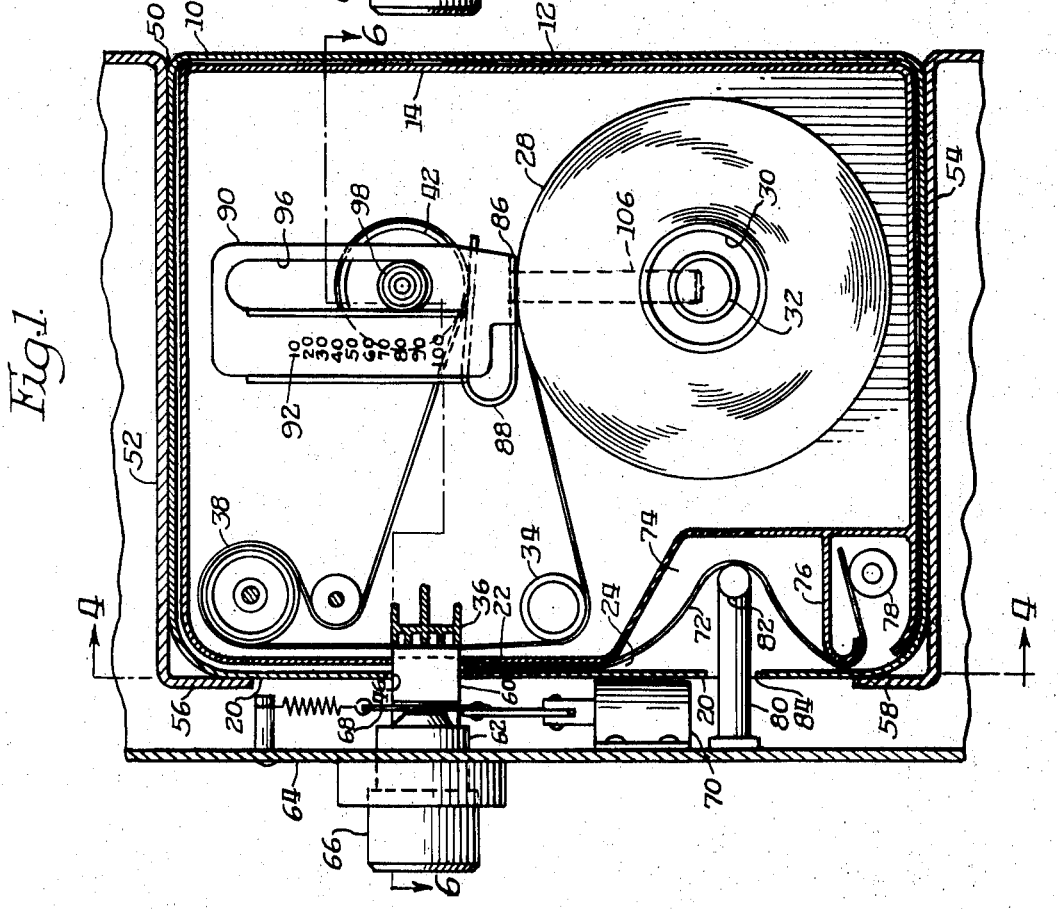
FIG. 1 is a cut-away elevation view of the film cartridge forming part of the present invention with one cover plate removed, the cartridge shown in relation to several elements of a microfilm camera housing.

The cartridge which is the subject of the present disclosure has integral therewith a curtain means 72 comprising an aperture plate which is adapted to cover exposure window 48 when the cartridge is not positioned in chamber 26 so as to prevent unnecessary exposure of the film remaining in the cartridge when not in use. Curtain means 72 is also constructed such that it automatically uncovers exposure window 48 when the cartridge is inserted in chamber 50. Referring particularly to FIG. 1, curtain means 72 comprises a strip of spring material, such as steel, which has the inherent characteristic of returning to a linear configuration after being relieved of a previously applied distorting force. The curtain means 72 is located in guide chamber 24 bounded by parallel walls 20, 22 beneath exposure window 48. Surfaces 16 and 18 of shells 12 and 14 extend over the ends of guide channel 24 and prevent curtain means 72 from moving laterally out of the guide channel.

The lower part of curtain means 72 extends into an open portion 74 in cartridge 10 located where end panel 22 extends inwardly and away from end panel 20. Open portion 74 is bounded by panels 20 and 22, and by anchor rib 76 which extends forwardly from panel 22. The lower terminus of curtain means 72 extends around anchor rib 76 and engages one side of anchor pin 78. Anchor rib 76 and anchor pin 78 function to hold the lower end of curtain means 72 in a fixed position relative to cartridge 10, while the opposite end of the curtain means is able to slide reciprocally in guide channel 24. When the curtain is in the position shown in FIG. 1, exposure window 48 is uncovered. When the free end of the curtain moves upward, it covers exposure window 48.

To automatically uncover exposure window 48 when cartridge 10 is inserted in chamber 50, a curtain control shaft 80 extends outwardly into chamber 50 from interior wall 64 of housing 46. The forward end of shaft 80 terminates in a bar 82 disposed at right angles to shaft 80. As cartridge 10 is inserted in chamber 50, curtain means 72 is initially in a linear configuration whereby the free end extends upward in guide channel 24 to cover exposure window 48. Upon the cartridge 10 being inserted in chamber 50 and moved towards its proper position against flanges 56, 58, bar 82 extends through slot 84 in cartridge 10 and engages curtain means 72 and distorts the curtain into opening 74, whereby the curtain 72 assumes the position illustrated in FIG. 1. In this position, the free end of curtain means 72 is drawn downward to uncover exposure window 48 and permit aperture block 60 to partially pass through the exposure window. The width of bar 82 is slightly less than the distance between surfaces 16 and 18, permitting bar 82 to gain easy access to curtain means 72 through slot 84. When the cartridge is ultimately removed from chamber 50, the distorting force applied by bar 82 to curtain means 72 is removed, and the inherent characteristics of the strip of spring material comprising curtain means 72 enable the curtain means to return to its linear configuration and again cover aperture window 48.

The advantage of the construction and location of curtain means 72 as described above lies in the fact that the light sealed chamber 26 formed internally of cartridge 10 is not disturbed by the curtain or the mechanical elements employed to operate the curtain. Therefore, upon the removal of cartridge 10 from chamber 50, the exposure window 48 is automatically covered, and no light is permitted to enter chamber 26 and expose the film 28 stored therein. Since all of the mechanical elements pertaining to curtain means 72 and its operation are located outside light sealed chamber 26, cartridge 10 can be inserted in or removed from chamber 50 without the danger of unnecessarily exposing film 28.

Another important feature of the present invention pertains to the provision of a single molded unit which functions as three individual, yet related, elements operable within cartridge 10. This molded element, identified by the numeral 86, and described with reference to FIGS. 1, 2, and 5, is shown in detail in FIG. 7 and may be fabricated from any moldable material, such as plastic, for example.

Molded element 86 comprises, first, a spring means 88 which consists of a molded strip bent into the shape illustrated in FIG. 7. Film 28 is mounted upon core 30 which has no radially extending side flanges. Take-up spool 42 likewise has no radially extending flanges. As a result, the spacing dimension between the central axes of core 30 and take-up spool 42 is less than twice the radial dimension of accumulated film on the core and spool. Spring means 88 functions to apply a constant compression force on the circumference of the film 28 remaining on core 30 and accumulated on take-up spool 42. As film 28 is driven along its path in cartridge 10 from core 30 to take-up spool 42, the radial dimension of reel 28 decreases and spring means 88 floats downward as the film is accumulated on take-up spool 42. As it moves downward, spring means 88 maintains a constant compressive pressure between the film remaining on core 30 and the film accumulated on take-up spool 42.

A second part of molded element 86 comprises film footage indicator means 90 which is a flat plate bearing numerals 92 indicating film footage, and located to move with spring means 88 inside cartridge 10 beneath surface 16. An aperture 94 is located in surface 16 through which the numerals 92 are visually displayed. As film 28 is advanced from core 30 to take-up spool 42, film footage indicator 90 moves downward with spring means 88 and visually displays numerals 92 in sequence through aperture 94. Numerals 92 may be calibrated to indicate the amount of film used, or the amount of film remaining. Elongated slot 96 is provided in indicator plate 90 to permit the indicator plate to slide along take-up spool spindle 98, which also functions as a guide for movement of indicator plate 90.

The third part of molded element 86 functions as a trip lever for end-of-reel signal switch 100 (FIG. 5) attached to lower wall 54 of cartridge chamber 50. Switch 100, when actuated by the depression of trip lever 104, generates a perceptible signal, either audible or visual, to indicate to the operator that the supply of film on reel 28 is nearly exhausted.

To actuate trip lever 104, an arm 106 extends downward from spring means 88 along the radius of film reel 28. Arm 106 extends through an elongated opening 108 in the surface 18 of cartridge 10, which opening is long enough to accommodate the full linear movement of arm 106. The lower portion of arm 106 terminates in a flange 110 which is adapted to contact trip lever 104 when the supply of film on reel 28 is nearly exhausted and spring means 88 has caused arm 106 and flange 110 to move to the position indicated by the numeral 112 in FIG. 5. When trip lever 104 is depressed downward by flange 110, switch 100 initiates a signal indicating that reel 28 is nearly exhausted.

Still other modifications to, and uses of, the present invention will readily occur to those skilled in the art. Therefore, the appended claims are to be construed to cover all equivalent structures falling within the scope and spirit of the invention.

We claim:
1. In a cartridge assembly adapted to mount a supply reel of film:
   a light sealed chamber in said cartridge;
   an exposure window adapted to permit light to enter said light sealed chamber;
   a take-up spool mounted in said light sealed chamber;
   means to guide said film along a path in said chamber extending from said supply reel past said exposure window to said take-up spool; and
   curtain means fixed at one end to said cartridge outside of said light sealed chamber and having another end slidable between parallel walls in said cartridge for selectively covering and uncovering said aperture window.

2. The cartridge assembly of claim 1 wherein said curtain means is normally spring biased to cover said exposure window, and movable to a position to open said exposure window upon application of a lateral force to a portion of said curtain means.

3. The cartridge assembly of claim 2 wherein said lateral force opposes said normal spring bias.

4. The cartridge assembly of claim 1 wherein said curtain means comprises:
   a strip of spring material having one dimension at least equal to the width of said exposure window;

said strip of spring material fixed at one end to anchor means provided on said cartridge;
   the other end of said strip of spring material adapted to slide between said parallel walls and between a position covering said aperture window and a position uncovering said aperture window;
   said cartridge having an opening therein adapted to receive means for applying a lateral force to said strip of spring material to distort said material.

5. The cartridge assembly of claim 4 wherein the distortion of said strip of spring material causes said other end to move between said parallel walls from said position covering said aperture window to said position uncovering said aperture window.

6. The cartridge assembly of claim 5 wherein removal of said lateral force from said strip of spring material causes said strip of spring material to move from a position opening said aperture window to a position closing said aperture window solely under the influence of the inherent characteristics of said strip of spring material.

7. In a film cartridge assembly adapted to be inserted in and removed from a camera housing:
   a light sealed chamber in said cartridge;
   means to mount a reel of film and a take-up spool in said light sealed chamber;
   an exposure window in said cartridge;
   means to guide said film along a path in said chamber extending from said reel and past said exposure window to said take-up spool;
   curtain means fixed at one end to said cartridge outside of said light sealed chamber and having another end slidable between parallel walls in said cartridge for selectively covering and uncovering said aperture window upon the application or removal respectively of a lateral force to a portion of said curtain means;

means extending from said housing adapted to engage said curtain means and apply said lateral force to said curtain means when said cartridge is inserted in said housing.

8. The cartridge assembly of claim 7 wherein:

said curtain means comprises a strip of spring material having one dimension at least equal to the width of said exposure window;

said strip of spring material fixed at one end to anchor means provided on said cartridge;

the other end of said strip of spring material adapted to slide between said parallel walls and between a position covering said aperture window and a position uncovering said aperture window;

said means extending from said housing adapted to engage and distort said strip of spring material when said cartridge is inserted in said housing, whereby said strip of spring material slides into said position uncovering said aperture window.

9. The cartridge assembly of claim 8 wherein said means extending from said housing is removed from engagement with said strip of spring material when said cartridge is removed from said housing, whereby said another end of said strip of spring material slides to said position covering said aperture window solely under the influence of the inherent characteristics of said strip of spring material.

10. The cartridge assembly of claim 8 wherein said cartridge includes an opening adjacent said strip of spring material adapted to receive said means extending from said housing, said opening permitting said last named means to engage said strip of spring material when said cartridge is inserted in said housing.

* * * * *